June 21, 1927. 1,633,235
L. H. THOEN
FEEDER MECHANISM AND HOUSING FOR COMBINED HARVESTERS
Filed May 1, 1924 2 Sheets-Sheet 1

INVENTOR.
LOWELL H. THOEN.
BY
Dewey, Strong, Townsend & Loftus
ATTORNEYS.

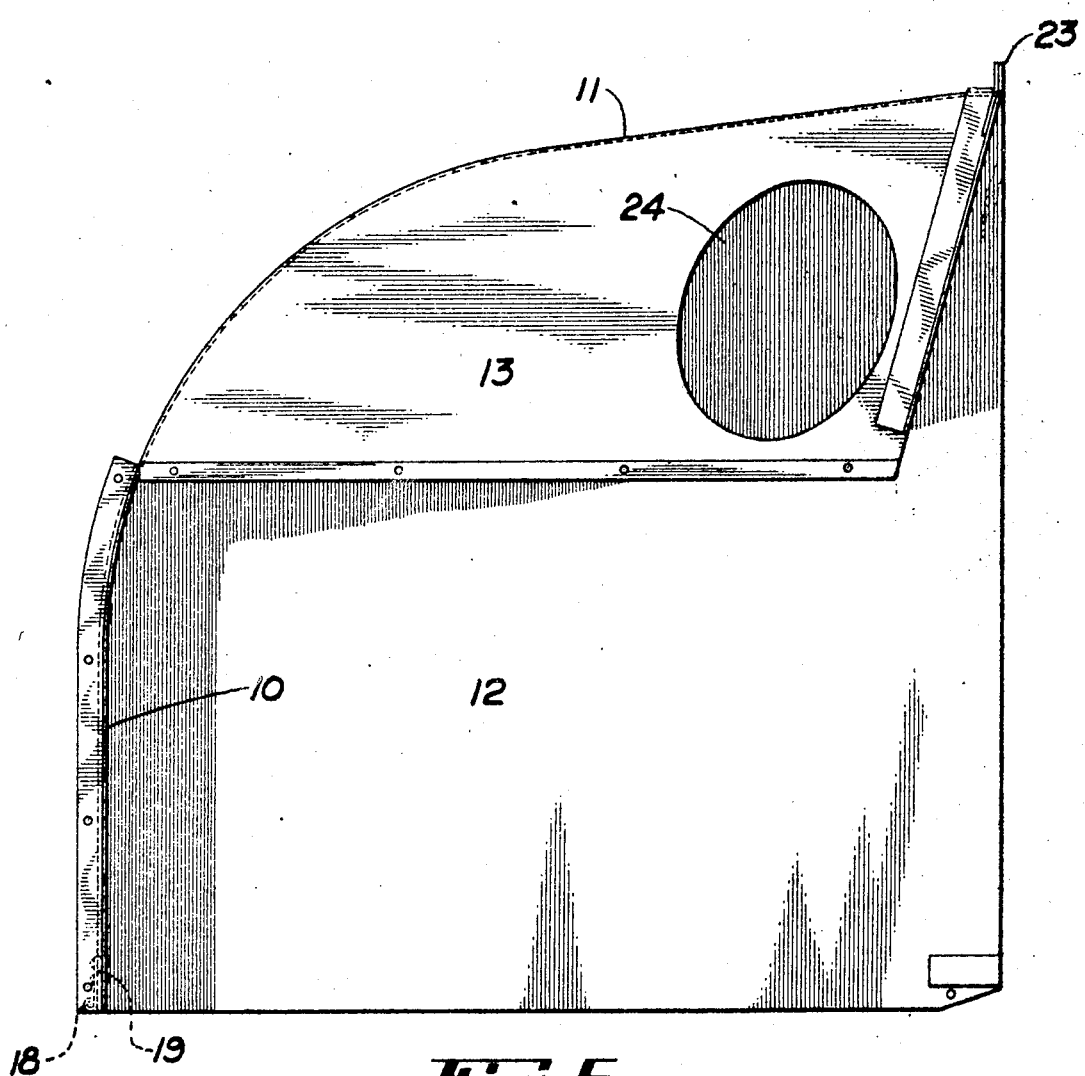

Patented June 21, 1927.

1,633,235

UNITED STATES PATENT OFFICE.

LOWELL H. THOEN, OF STOCKTON, CALIFORNIA, ASSIGNOR, BY MESNE ASIGNMENTS, TO WESTERN HARVESTER CO., OF SAN FRANCISCO, CALIFORNIA, A CORPORATION OF CALIFORNIA.

FEEDER MECHANISM AND HOUSING FOR COMBINED HARVESTERS.

Application filed May 1, 1924. Serial No. 710,423.

This invention relates to a housing and mechanism for feeding grain from a header to the thresher in a combined harvester.

The object of the invention is to provide a feed house which will effect proper feeding under all conditions of fluffy grain, weeds, or other difficult conditions. In carrying out this object I provide a feed house of special curved design without pockets or corners to catch the grain, regardless of how fluffy or bunchy it may come from the header. This feed house is preferably constructed of sheet metal and has a flexible mounting on the main frame so as to avoid twisting or distorting under operating conditions. Within the feed house is an endless conveyer having means accessible from the exterior for taking up any slack and provided with a special form of safety snap clutch for preventing breakage of the parts in case an unyielding obstruction should find its way into the feeder mechanism.

One form which my invention may assume is exemplified in the following description and illustrated in the accompanying drawings, in which—

Fig. 5 shows a rear end elevation of the feed house detached from the feed conveyer.

Figure 1:
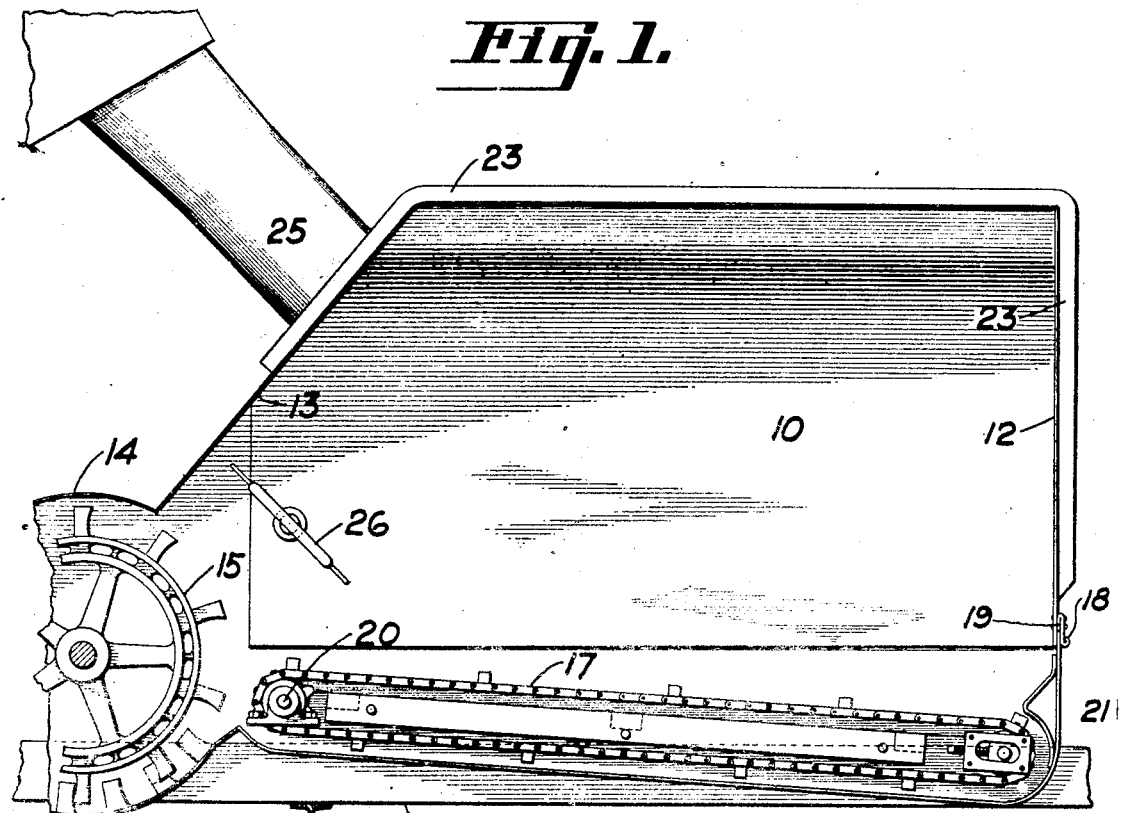
Fig. 1 shows a longitudinal sectional view through the feeder mechanism and housing.

The feed house of the present invention is preferably constructed of sheet metal and comprises a back side wall 10 curving gradually into a top or roof section 11. There is a vertical end wall 12 at the front of the house and a downwardly and rearwardly inclined end wall 13 at the rear of the house, the latter terminating above a housing 14 which surrounds a threshing cylinder 15. The feed house is open at its bottom and rests upon a conveyer housing 16 wherein is arranged an endless conveyer 17, usually termed a feeder. The bottom edges of the feed house are reinforced with a stiffening arrangement which also provides means for fastening the feed house to the housing in which the conveyer is carried. This is in the form of a stiffening band 18 having a short bent portion 19 lying against and secured to the exterior surface of the feed house, leaving a space between to receive the upper edge of the conveyer housing, the latter being a box-like structure, preferably formed of sheet metal and open at its top. The feed house is thus stiffened and supported and can be removed as an entirety from the conveyer housing, thus giving ready access to the feed conveyer and threshing cylinder and other interior mechanism.

The conveyer housing is supported upon a drive shaft 20 and an idler shaft 21 which are arranged at opposite ends of the endless conveyer, said shafts being journaled in bearings which are secured to the side bars 22 of the harvester frame. The edges of the feed house, other than at the bottom, are preferably provided with angle bars 23 for reinforcing and stiffening the structure. In the inclined rear end wall 13 is an opening 24 to receive a spout 25 leading from the usual return elevator of the thresher mechanism. Journaled in the feed house in front of and above the threshing cylinder is a down-beater 26.

Figure 3:
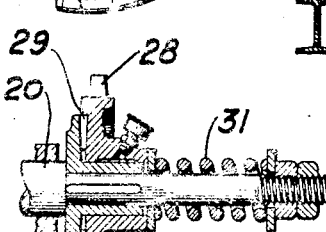
Fig. 3 shows a detail sectional view of the safety snap clutch for driving the endless feed conveyer.
Figure 4:
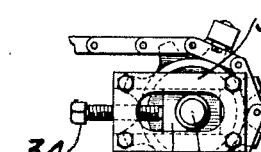
Fig. 4 shows a detail view of one of the adjustable bearings for the idler shaft of the feed conveyer.
Figure 2:
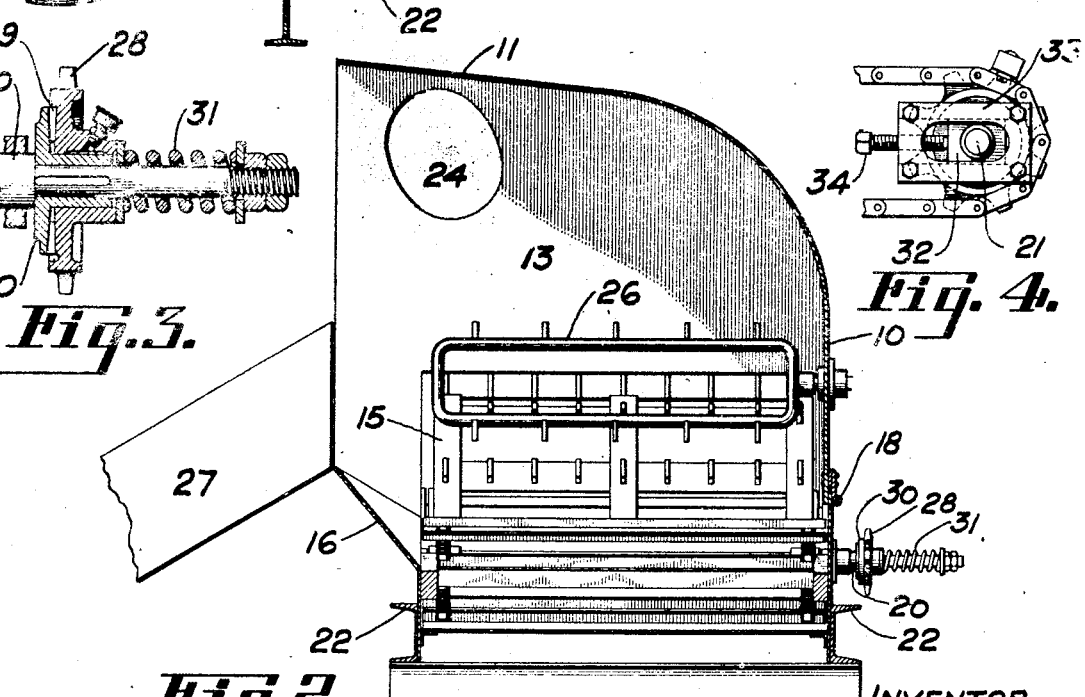
Fig. 2 shows a vertical, transverse, sectional view of the same.

Grain is fed into the feed house and deposited upon the feed conveyer 17 by means of the usual draper or conveyer 27 forming part of the header mechanism. The feed conveyer is driven by a chain and sprocket, these driving connections including a safety snap clutch, as shown in Fig. 3. This clutch mechanism comprises a sprocket wheel 28 having corrugations or ribs 29 formed on one face thereof and a driven clutch disk 30 also having formed on its face corrugations or ribs to co-act with the ribs 29 on the face of the sprocket wheel. This driven clutch disk is fixed to the shaft 20 and has a hub portion on which the sprocket wheel 28 is slidable. The co-operating ribs or corrugations are held yieldingly in driving relation by means of a spring 31 carried upon the outer end of the shaft 20 and pressing against the sprocket wheel 28.

The idler shaft 21 is journaled in bearing blocks 32 which are slidable in a cage 33, the latter being secured to the side bars of the harvester frame. By means of set screws 34 the slidable blocks 32 can be adjusted so as to take up any slack which may occur in the feed conveyer or for the purpose of alining the shafts 20 and 21. These set screws being disposed outside of the conveyer housing are accessible at all times from the exterior of the machine.

In the operation of the mechanism above described grain is deposited upon the feed conveyer by the header mechanism, and, due to the shape of the feed house, there is no danger of the grain piling up in the corners and interfering with even and proper feeding of the grain to the cylinders. The downbeater in front of and above the threshing cylinder also assists in obtaining an even feeding of the grain through the thresher mechanism. Due to the fact that the housing which surrounds the feed conveyer is suspended upon the conveyer shafts 20 and 21, and the further fact that the feed house is carried upon this conveyer housing, it will be seen that a flexible mounting is provided which will prevent distorting or twisting of the feed house when the harvester is being operated over rough or uneven ground. The feed house is readily detachable for the purposes of storage or shipment.

Various changes in the construction and arrangement of the several parts herein shown and described may be employed without departing from the spirit of my invention as disclosed in the appended claims.

Having thus described my invention, what I claim and desire to secure by Letters Patent is:

1. In a combined harvester having header and thresher mechanism, a housing for the thresher mechanism, an endless conveyer for feeding grain from the header to the thresher mechanism, a conveyor housing receiving the conveyer, and a feed house overlying the feed conveyer and mounted upon the conveyor housing and connected with and forming a continuation of the thresher housing and having one side open for the admission of grain from the header mechanism, said feed house being formed with a back side curving gradually into a top or roof portion.

2. In a combined harvester having header and thresher mechanism, a housing for the thresher mechanism, an endless conveyer for feeding grain from the header to the thresher mechanism, a conveyor mechanism connected at one end with the thresher housing at the lower portion thereof and a feed house overlying the feed conveyer and mounted upon the conveyor housing and connected with and forming a continuation of the thresher housing and having one side open for the admission of grain from the header mechanism, said feed house being formed with a back side curving gradually into a top or roof portion, the end wall of the feed house adjacent the thresher mechanism being inclined downwardly and outwardly.

3. In a combined harvester having header and thresher mechanism, a housing for the thresher mechanism, an endless conveyer for feeding grain from the header to the thresher mechanism, a housing surrounding the feed conveyer and extending a slight distance above the same and being open at its top and a feed house formed of sheet metal and detachably mounted upon the conveyer housing, said feed house having a back side wall and a top wall joined by a curved section and connected with and forming a continuation of the housing of the thresher mechanism.

4. In a combined harvester having header and thresher mechanism, a housing for the thresher mechanism, an endless conveyer for feeding grain from the header to the thresher mechanism, a housing surrounding the feed conveyer and connected at one end with the thresher mechanism housing at the lower portion thereof and extending a slight distance above the same and being open at its top and a feed house formed of sheet metal and detachably mounted upon the conveyer housing, said feed house having a back side wall and a top wall joined by a curved section, and connected with and forming a continuation of the housing for the thresher mechanism, said detachable mounting including a stiffening band extending around the bottom edge of the feed house and spaced therefrom to form a pocket for the reception of the walls of the conveyer housing.

5. In a combined harvester having header and thresher mechanism, a housing for the thresher mechanism, an endless conveyer for feeding grain from the header to the thresher mechanism including a drive and an idler shaft journaled on the frame of the thresher, a housing for the conveyer supported by said shafts and a feed house detachably mounted on the conveyer housing and connected with and forming a continuation of the thresher mechanism housing and formed with a back wall, a roof section and end walls.

6. In a combined harvester having a threshing cylinder, a cylindrical housing for the threshing cylinder, an endless conveyer for feeding grain thereto, a conveyor housing receiving the endless conveyor and connected at one end with the housing for the threshing cylinder, a feed house overlying the conveyer and mounted upon the conveyor housing and extending from and forming a continuation of the housing of the threshing cylinder and formed with a back side wall curving gradually into a top or roof section and having a downwardly and outwardly inclined end wall adjacent the threshing cylinder.

7. In a combined harvester having a threshing cylinder, a cylindrical housing for the threshing cylinder, an endless conveyer for feeding grain thereto, a conveyor housing connected at one end with the said housing at the bottom thereof and receiving the endless conveyor, a feed house overlying the conveyer and mounted upon the conveyor housing and connected with and forming a continuation of the housing of the threshing cylinder and formed with a back side wall curving gradually into a top or roof section and having a downwardly and outwardly inclined end wall adjacent the threshing cylinder, and a down-beater journaled in the feed house and positioned above and in front of the threshing cylinder.

LOWELL H. THOEN.